March 11, 1930. H. C. SPAHN 1,750,200
MOTOR SUPPORTING STAND
Filed Oct. 23, 1928 2 Sheets-Sheet 2

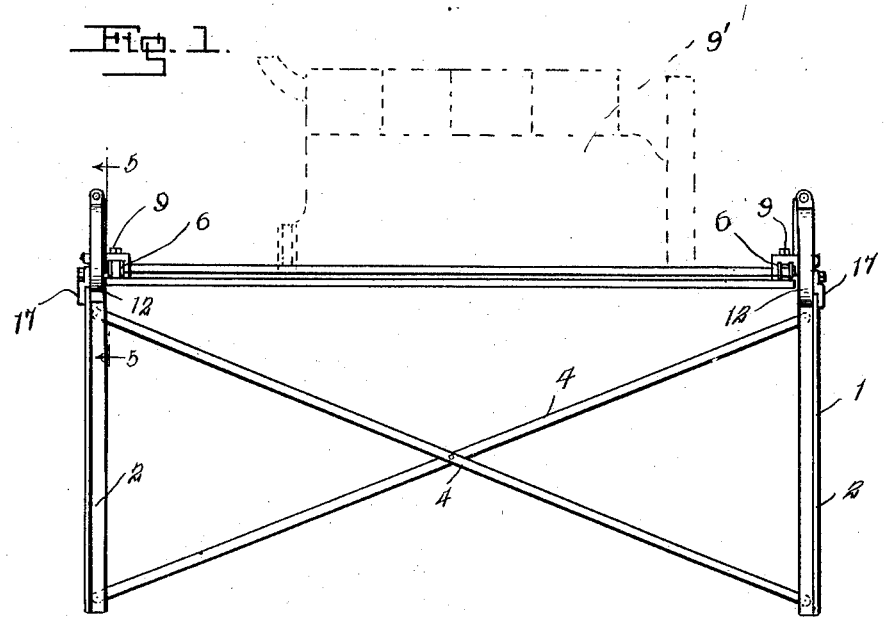
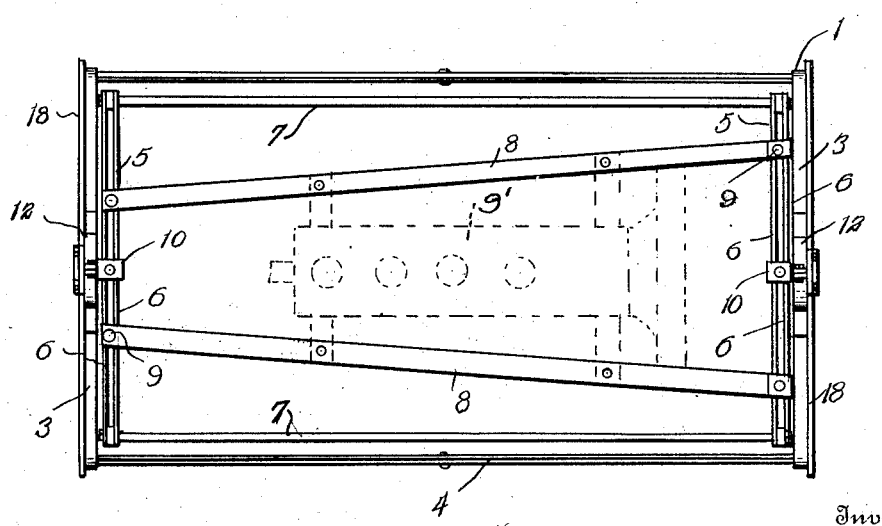

Inventor
H.C.Spahn
By Lacey & Lacey, Attorneys

Patented Mar. 11, 1930

1,750,200

UNITED STATES PATENT OFFICE

HILBERT C. SPAHN, OF KEWANEE, ILLINOIS

MOTOR-SUPPORTING STAND

Application filed October 23, 1928. Serial No. 314,441.

The present invention is directed to improvements in motor supporting stands.

The primary object of the invention is to provide a device of this character so constructed that a motor can be supported in various positions upon the stand to enable a mechanic to conveniently have access to the various parts thereof.

Another object of the invention is to provide a device of this character so constructed that the motor can be held in various positions to permit inspection and repairs, the construction being such that a motor can be assembled or disassembled upon the stand.

With these and other objects in view, this invention resides in the novel features of construction, formation, combination and arrangement of parts to be hereinafter more fully described, claimed and illustrated in the accompanying drawings, in which:—

Figure 1 is a side view of the device,

Figure 2 is a top plan view,

Figure 3:
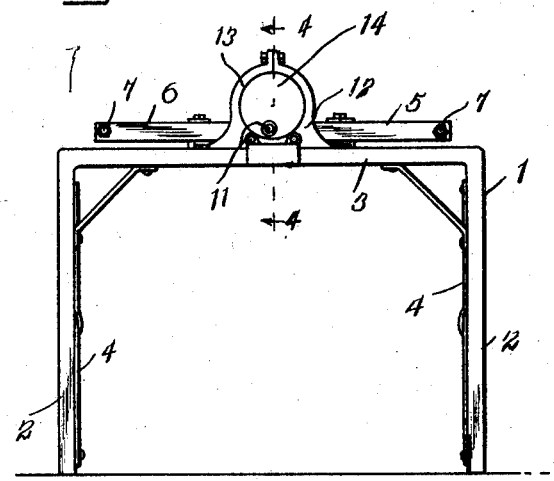
Figure 3 is an end view.

The stand comprises a pair of end frames 1 including legs 2 and upper connecting bars 3, said legs and bars being formed from angle-iron of suitable gage. These end frames are maintained in spaced relation by crossed brace bars 4.

A motor supporting cradle is employed and consists of end members 5 comprising spaced bars 6—6, said bars being connected by tie rods 7; and having their ends engaged upon the members 5 are supporting bars 8—8, the ends of which carry clamping bolts 9 for engagement in the spaces between the respective bars 6, said bolts serving to clamp the bars 8 in adjusted position. The bars 8 obviously serve to support the motor 9' which may be secured to said bars in any appropriate manner. Fixed to the members are blocks 10 which carry trunnions 11, each end member 5 is a block 10, each block being provided with a trunnion 11 having a nut 11' threaded thereon.

Mounted upon the bars 3 of the end frames are blocks 12 having split bearings 13 formed therein and in which are mounted disks 14, said disks having eccentrically disposed bearings 15 formed therein for rotatably receiving the trunnions 11. The bearings 13, being of the split type, can be readily spread to permit rotation of the disks 14 to various positions of adjustment, after which the bearings are clamped to hold the disks in adjusted position. Obviously, the bearings 15 travel in an arc upon adjustment of the disks so that they may be elevated or lowered, and since the trunnions 11 engage in said bearings, the elevation of the cradle 5 can be conveniently varied. After the disks have been adjusted and firmly clamped by contracting the bearings 13, the cradle 5 may be adjusted at various angles and the nuts 11 clamped against the disks to hold the trunnions against rotation, whereby the cradle will be retained in adjusted inclined position.

Figure 4:
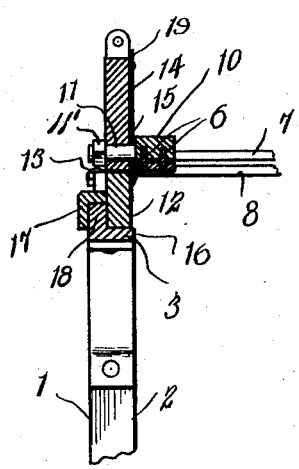
Figure 4 is a sectional view on line 4—4 of Figure 3.
Figure 5:
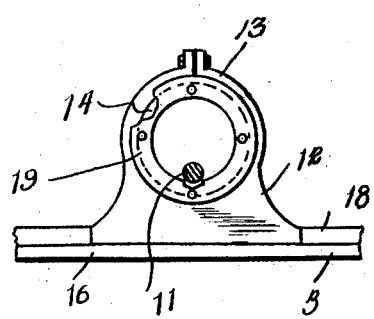
Figure 5 is a sectional view on line 5—5 of Figure 1.

The blocks 12 slidably engage the horizontal webs 16 of the bars 3 and are held in adjusted positions thereon by the clamps 17, said clamps being bolted to the blocks 12 and engage the vertical webs 18 of said bars, as more clearly shown in Figure 4 of the drawings.

Since the cradle 5 can be raised or lowered upon fixing the disks 14, and the blocks 12 can be adjusted upon the bars 3, the motor can be placed in various positions and can be conveniently inspected or repaired.

The disks 14 have secured to their inner faces rings 19 to prevent outward movement thereof.

While the stand is more particularly designed for supporting gas motors, it is not necessarily limited to such use since various articles can be conveniently secured thereto.

From the foregoing, it is thought that the construction, operations and many advantages of the herein-described invention will be apparent to those skilled in the art, without further description; and it will be understood that various changes in the size, shape, and proportion and minor details of construction, may be resorted to without departing from the spirit or sacrificing any of the advantages of the invention.

What is claimed is:—

1. A stand of the class described, comprising end frames, blocks adjustably mounted thereon, bearings carried by the blocks, disks rotatably mounted in the bearings, a cradle, and means carried by the cradle for rotatably engaging the disks.

2. A stand of the class described, comprising end frames, blocks adjustably mounted thereon, said blocks having bearings, disks rotatably mounted therein, a cradle, said cradle including a frame having trunnions upon its end bars for rotatably engaging said disks.

3. A stand of the class described, comprising spaced end frames, blocks adjustably mounted upon the end frames, said blocks having bearings carried thereby, disks rotatably mounted in the bearings, said disks having eccentrically disposed bearings carried thereby, a cradle, trunnions carried by the cradle and rotatably engaged with the second-named bearings, and means carried by the bearings for maintaining the disks in adjusted position.

4. A stand of the class described, comprising end frames, blocks adjustably mounted upon the end frames, bearings carried by the blocks, disks rotatably mounted in the bearings, a cradle consisting of end bars, motor supporting bars supported by the end bars, said end bars having trunnions carried thereby for rotatably engaging said disks, and means carried by the bearings for holding the disks in various positions of adjustment.

5. A stand of the class described, comprising end frames, said frames including upper bars, blocks adjustably mounted upon said bars, bearings carried by the blocks, disks rotatably mounted in the bearings and having eccentrically located bearings formed therein, a cradle including end members, motor supporting bars adjustably connected with the members, and trunnions carried by the end bars for rotatably engaging the bearings formed in said disks.

In testimony whereof I affix my signature.

HILBERT C. SPAHN. [L. S.]